Jan. 20, 1948.  A. ROBERTSON ET AL  2,434,720
MOUNTING MEANS FOR FLEXIBLE STRAP CLIPS
Filed June 26, 1944
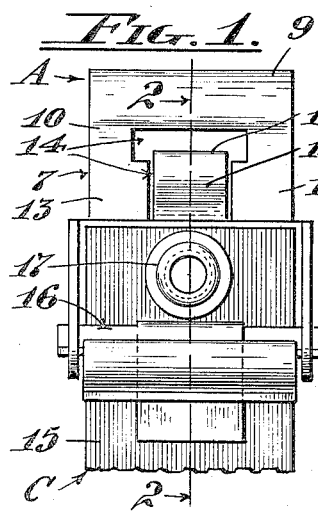
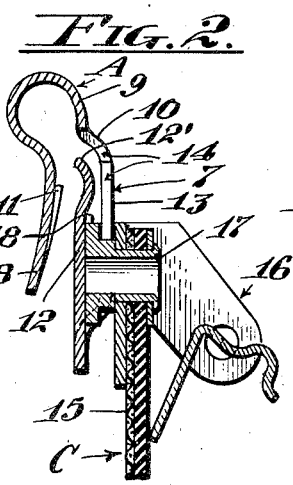
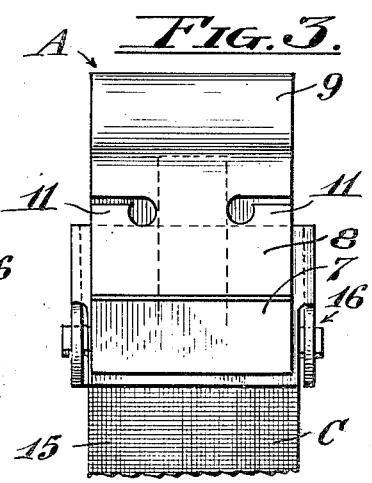
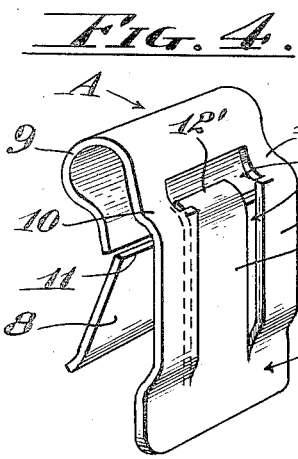
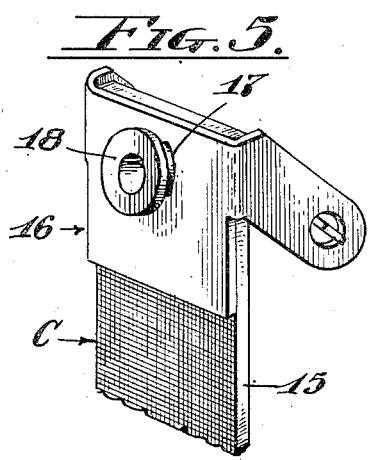
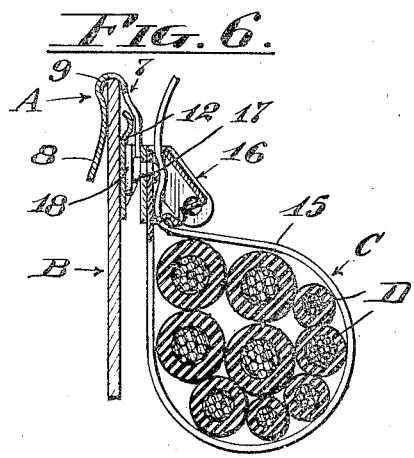
Inventors
Archibald Robertson
and Dale W. Merritt:
R. S. Berry
Attorney Patented Jan. 20, 1948

2,434,720

UNITED STATES PATENT OFFICE 2,434,720

MOUNTING MEANS FOR FLEXIBLE STRAP CLIPS

Archibald Robertson, North Hollywood, and Dale W. Merritt, Torrance, Calif., assignors to Adel Precision Products Corp., Burbank, Calif., a corporation of California Application June 26, 1944, Serial No. 542,202

6 Claims. (Cl. 248—74)

This invention relates to a mounting means for flexible strap clips for supporting wires or conduits of the character shown in our copending application for patent executed on even date herewith bearing Serial No. 539,913, filed June 12, 1944, now Patent No. 2,426,708, granted September 2, 1947, and more particularly pertains to a mounting means for securing strap clips to a support as in aircraft, surface craft and the like where the wires or conduits are secured to the structural part or adjacent which the wires or conduits are extended.

An object of this invention is to provide a mounting means for flexible strap type clips such as described which will greatly facilitate the installation of such clips in sub-assembly formations wherein the clips are first clamped around the wires or conduits and then secured to the structural parts past or adjacent which the wires or conduits are to be extended, in that the mounting means may be mounted on the clips before or after the clips are clamped on the wires of conduits, or may be first mounted on the support after which the clips may be detachably connected thereto and securely held thereby in all cases without the use of bolts, nuts or the like.

A further object of our invention is to provide a mounting means such as described which may first be mounted on the support apart from the clip whereby the clip whether clamped around the wires or conduits or before being so clamped may be quickly and easily attached to the mounting means to remain securely held thereby.

Another object of our invention is to provide a mounting means in the form of a friction clamp which is adapted to have the clip detachably mounted thereon and to be detachably mounted on the support yet will effectively hold the clip thereon and likewise be held on the support so as to prevent accidental dislodgement from the support as well as accidental separation of the clip therefrom.

Another object is to provide a mounting clasp such as described which is made of a single piece of spring metal and constructed so that the rivet or fastening employed in the clip to secure the strap to the buckle or clamp the clip, projects outwardly and is formed to serve as a means for detachably connecting the clasp to the clip.

With the foregoing object in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a front elevation of a mounting clasp embodying this invention as it would appear when connected with the clip part of which is also shown in front elevation;

Fig. 2 is a sectional view of the clasp and clip on the line 2—2 of Fig. 1;

Fig. 3 is a rear elevation of the clamp as when attached to the clip;

Fig. 4 is a perspective view of the clasp removed from the clip;

Fig. 5 is a perspective of the clamp or buckle on the clip showing the rivet head formation providing for attachment of the clasp to the clip;

Fig. 6 is a part sectional part side elevational view of a clip and the clasp hereof as when installed on a support to support a bundle of wires.

Referring to the drawings more specifically A generally designates a mounting means embodying the present invention, adapted to be fitted over and frictionally clamped on an edge of a support B as shown in Fig. 6 to support thereon a flexible strap type of clip C for wires D, or a conduit not shown, the mounting means being detachable from the support, and the clip being detachable from the mounting means to facilitate installation of the mounting means and clip as will be hereinafter more fully described.

As here provided the mounting means A is in the form of a clasp made from a single piece of spring metal bent into substantially an inverted U-shape with its opposed portions or legs 7 and 8 arranged to be forced apart on the application of the clasp to the support whereby said legs will effectively frictionally grip the support to hold the clasp in place thereon as shown in Fig. 6.

The high portion or bend 9 of the clasp is curved so as to be nearly circular in cross section to afford the desired spring action yet prevent weakening of the metal with repeated flexing of the legs.

The leg 7 of the clasp is substantially straight from its free end to a point near the bight portion 9 and stands vertically, that is, parallel to the support D when mounted thereon, except for a curved offset portion 10 connecting it with the bight portion 9 so as to offset the latter. The leg 8 is extended divergently from and is shorter than the leg 7 and is somewhat curved from the bight portion 9 to its outer end whereby the clasp is given a wide mouth affording a ready application thereof to the support.

Lateral cuts or slits in the sides of the leg 8 provide spurs or jaws 11 adapted to bite into and grip the support to securely hold the clasp thereon. The offset bight portion 9 causes the clasp to be so distorted and tensioned when the clasp is forced into final holding position in which the edge of the support is received in said bight portion, that the legs 7 and 8 will tightly grip the support and securely hold the clasp thereon as seen in Fig. 6. The spurs or jaws 11 do not appreciably resist the movement of the clasp onto the support but do effectively resist withdrawal of the clasp.

To provide for detachably connecting the clip C with the clasp A or vice versa, the leg 7 of the clasp is cut and stamped to form a tongue-like jaw 12 between outwardly offset vertical side portions 13. The metal of the leg 7 is cut out and so stamped for forming the jaw 12 and offset side portions 13 that there is formed a T-slot 14 in the leg which slot affords the connection of the clip to the clasp as will be hereinafter described.

The clip C is formed of a flexible strap 15 adapted to be looped around the wires D as shown in Fig. 6, and is provided with a buckle 16 by means of which the strap is clamped tightly as a loop around the wires. This buckle per se forms no part of the present invention and as it is fully described in our copending application hereinbefore identified no further description is here given except to point out that it is fastened to the strap by means of a rivet or like fastening 17 having a head 18 adapted to interlock with the clasp A by being fitted in the T-slot 14 in the leg 7 of said clasp as shown in Figs. 2 and 6, the head 18 then lying between the jaw 12 and side portions 13. The jaw 12 will be forced inwardly by the head 18 into frictional contact with the support and the head will be held under the tension of the jaw 12 and portions 13 so as to effectively resist accidental dislodgment from the clasp.

It will now be apparent that the clasp A hereof may be fitted onto the head 18 on the clip C or vice versa, before or after the clip is clasped around the wires, after which the clasp is mounted on the support, or the clasp may be first fitted to the support and the clip then connected thereto, depending on the installation requirements at hand, and without in any case requiring the use of extraneous fastenings or the use of tools. These various methods of installation make it possible to save time and labor in installation of the clips regardless of the nature of the installation space or the shape or location of the structure on which the clasp is mounted to support the clip.

It should be noted that the tongue-like jaw 12 has a curved or hook-like free end 12' to aid in effecting a tight gripping and holding action on the support and that this, as well as the other constructions and arrangements of the clasp make it possible to fit it onto supports of different thicknesses and shapes with a reliable gripping and holding action in all cases. In some installations the clasp need only be pushed onto the support sufficiently to bring the curved or hook end over the edge of the support as this end in fitting over said edge together with the tight clamping action afforded by the clasp will suffice to securely hold it on the support.

While we have shown and described a specific embodiment of our invention we do not limit ourselves to the exact details of construction set forth, and the invention embraces such changes, modifications and equivalents of the parts and their formation and arrangement as come within the purview of the appended claims.

We claim:

1. In a mounting means for a wire or conduit supporting clip having a member projecting therefrom to afford a detachable connection thereof with the mounting means, a U-shaped spring metal clasp the legs of which are adapted to lie upon opposite sides of a support on which the clasp is mounted, and a resilient tongue-like jaw carried by and being inwardly offset from one of said legs so as to grip the support between it and the other of said legs, the leg carrying said jaw having a slot therein for reception of said member on the clip to detachably support the clip on said clasp and being outwardly offset between its ends.

2. In a mounting means for a wire or conduit supporting clip having a headed member projecting therefrom to afford a detachable connection thereof with the mounting means, a spring metal U-shaped clasp the legs of which are adapted to lie upon opposite sides of a support on which the clasp is mounted, and a tongue-like jaw formed integral at one end with one of said legs in inwardly offset relation thereto so as to grip the support between it and the other of said legs, the leg from which said jaw is struck having an outwardly offset portion between its ends in which portion is formed a T-shaped slot for reception of the headed member on the clip to detachably support the clip on said clasp with the headed member abutting said jaw.

3. In a mounting means for a wire or conduit supporting clip having a headed member projecting therefrom to afford a detachable connection thereof with the mounting means, a spring metal U-shaped clasp the legs of which are adapted to lie upon opposite sides of a support on which the clasp is mounted, and a tongue-like jaw carried by one of said legs and being for the most part inwardly offset from and substantially parallel with a major part of said one leg, the leg from which said jaw is struck having a T-shaped slot therein for reception of the headed member on the clip to detachably support the clip on said clasp, said jaw being arranged to act as a stop and guide for the headed member when mounting the clip on said clasp.

4. In combination with a conduit or wire embracing clip having a headed projection, a clasp of substantially an inverted U-shape adapted to embrace a support with its opposed legs frictionally contacting opposite sides of the support, means for detachably interlocking the clasp with the headed projection including a slot provided in one leg of the clasp for reception of the headed fastening, and resilient members projecting inwardly from opposed faces of said legs in a direction towards the bight portion of said clasp for contacting the support to frictionally hold the clasp thereon.

5. In combination with a conduit or wire embracing clip having a headed projection, a clasp of substantially an inverted U-shape adapted to embrace a support with its opposed legs frictionally contacting opposite sides of the support, and means for detachably interlocking the clasp with the headed projection including a slot provided in one leg of the clasp for reception of the headed fastening and a resilient jaw carried by the slotted leg and disposed between said legs to yieldingly contact the support and said headed projection.

6. In combination with a conduit or wire embracing clip having a headed projection, a clasp of substantially an inverted U-shape adapted to embrace a support with its opposed legs frictionally contacting opposite sides of the support, and means for detachably interlocking the clasp with the headed projection including a slot provided in one leg of the clasp for reception of the headed fastening and a resilient jaw carried by the slotted leg and disposed between said legs to contact the support and said headed projection, said slot being substantially T-shaped, said slotted leg having a portion offset toward the other leg and in which the head of said T-shaped slot is located.

ARCHIBALD ROBERTSON.
DALE W. MERRITT.

REFERENCES CITED

The following references are of record in the file of this patent:

UNITED STATES PATENTS

| Number | Name | Date |
|---|---|---|
| 719,462 | Gysling | Feb. 3, 1903 |
| 788,252 | Dalton | Apr. 25, 1905 |
| 1,045,898 | Shaw | Dec. 3, 1912 |
| 2,148,848 | Wiley | Feb. 28, 1939 |
| 2,195,068 | Wiley | Mar. 26, 1940 |
| 2,367,322 | Wright et al. | Jan. 16, 1945 |

FOREIGN PATENTS

| Number | Country | Date |
|---|---|---|
| 4,883 | Great Britain | 1891 |
| 241,151 | Germany | Nov. 27, 1911 |